Figure 4:
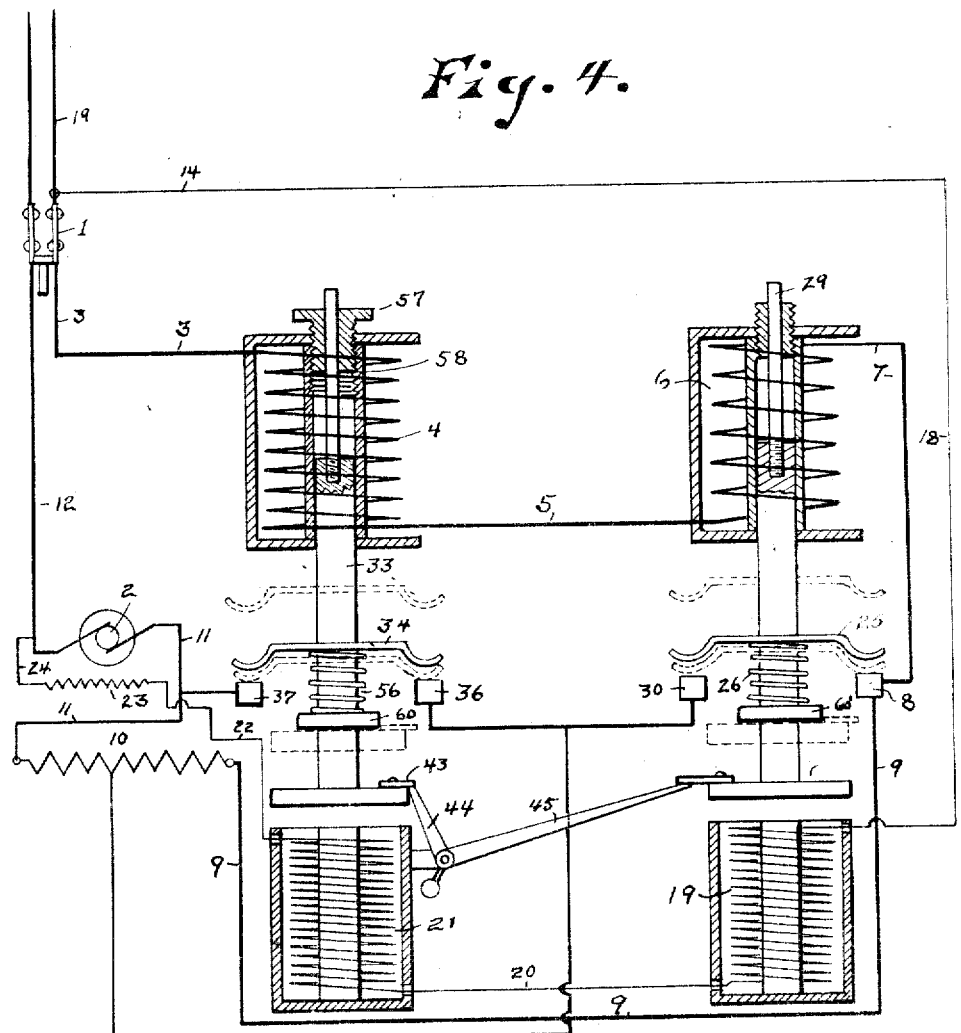

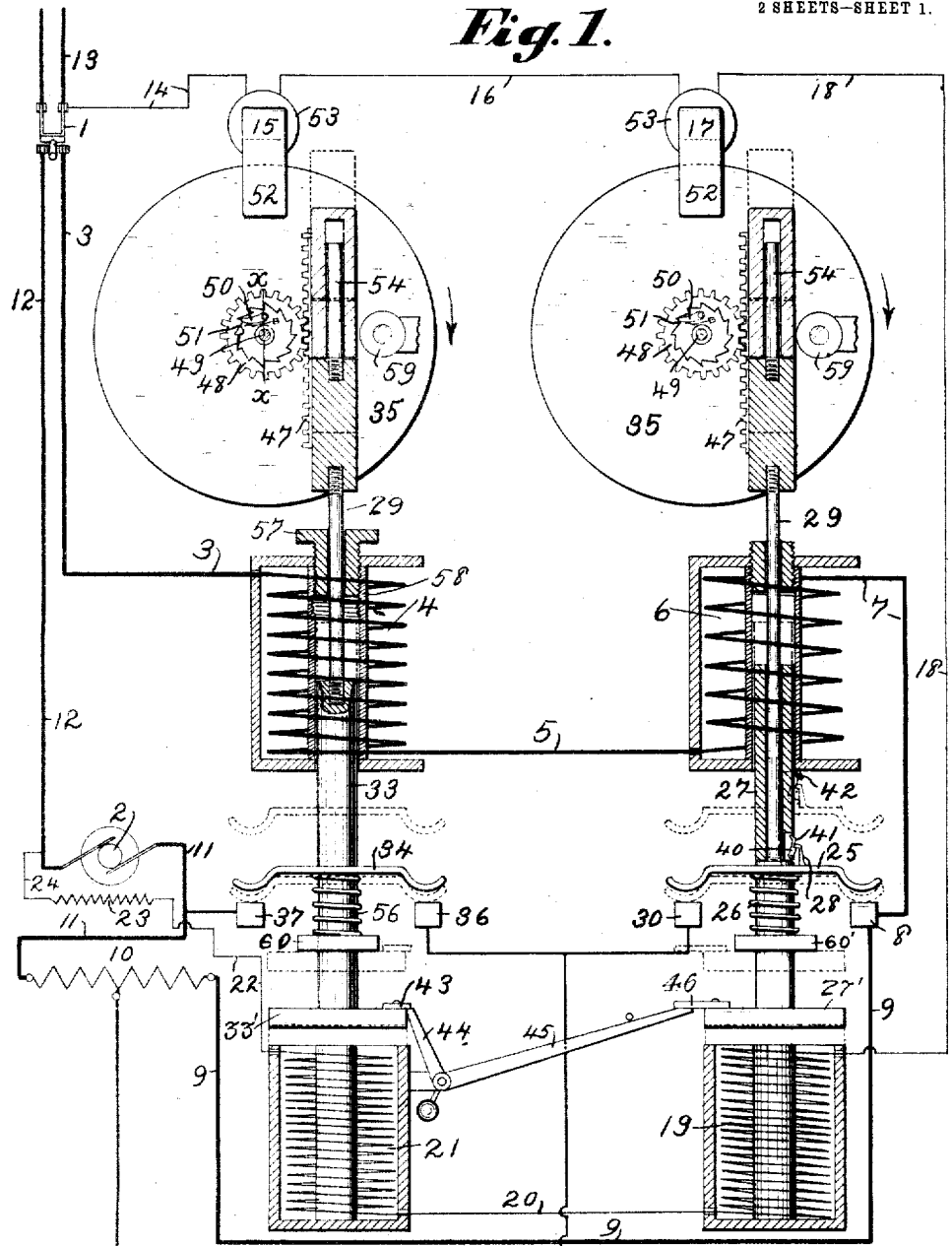

UNITED STATES PATENT OFFICE.

JOHN B. CALDERWOOD, OF MILWAUKEE, WISCONSIN, ASSIGNOR TO ALLIS-CHALMERS COMPANY, A CORPORATION OF NEW JERSEY.

AUTOMATIC STARTER FOR ELECTRIC MOTORS.

1,017,246.   Specification of Letters Patent.   Patented Feb. 13, 1912.

Application filed December 30, 1904. Serial No. 238,884.

*To all whom it may concern:*

Be it known that I, JOHN B. CALDERWOOD, a citizen of the United States, residing at Milwaukee, county of Milwaukee, and State of Wisconsin, have invented new and useful Improvements in Automatic Starters for Electric Motors, of which the following is a specification.

My invention relates to improvements in automatic starters for electric motors.

It is generally necessary in starting a motor that the full voltage of the line be not applied to the terminals of the motor immediately, for as at first the impressed electromotive force is not opposed by any counter-electromotive force the motor is otherwise liable to be greatly damaged by an excessive rush of current. It is often desirable that the subsequent increase in the electromotive force applied to the terminals of a motor as the motor approaches its maximum speed, be automatic, so that no attention is required other than the closing of the main switch.

It is the object of my invention to obtain such an automatic action while fully protecting the motor against too heavy current. In attaining this object, a resistance, or each of several sections of a resistance, in the armature circuit of the motor has connected in shunt to it a normally open switch, which, upon the closing of the motor circuit, is first moved farther away from its closed position, and then moved to its closed position to cut out the resistance. The closing of the switches, if there be more than one, is preferably successive. The movements of the switch or switches is preferably obtained by electromagnets, the magnets which move them away from closed position preferably being connected in series with the motor armature while those which move them to closed position are preferably connected in parallel thereto. The return of the switches to normal position after they have been moved farthest away from closed position may be retarded by the gradually weakening magnets in series with the motor armature, or by some other time element device, or by both.

The various novel features of my invention will appear from the description and drawings, and will be particularly pointed out in the claims.

Figure 1 is a semi-diagrammatic view of a system embodying my invention, some of the parts being shown in section; Fig. 2 is a vertical section on the line $x$—$x$ of Fig. 1; Fig. 3 is a detail of the time element device; and Fig. 4 is a diagrammatic view of a modification.

The motor 2 to be controlled may be connected to the main line 13 by a switch 1. The armature circuit extends from one side of the line through said switch, the conductor 3, the solenoid 4, the conductor 5, the solenoid 6, the conductor 7, the contact 8, the conductor 9, the resistance 10, the conductor 11, the motor armature 2, the conductor 12, and the switch 1, to the other side of the line. The shunt field circuit of the motor extends from one side of the line through the conductor 14, the magnet 15, the conductor 16, the magnet 17, the conductor 18, the magnet 19, the conductor 20, the magnet 21, the conductor 22, the shunt field winding 23, and the conductor 24, to the conductor 12, which is connected to the other side of the line. The resistance 10 may be sectional, if desired, with any desired number of sections, there being two sections in each of the modifications illustrated. These sections may be short-circuited respectively by switches 25 and 34. The movable members of these switches coöperate with the fixed contacts 8 and 30, and 36 and 37, respectively. The switches are biased to the open position illustrated in full lines, as by springs 26 and 56 respectively, these springs bearing against the switches and the parts 60' and 60 of the frame of the apparatus. Attached to the switches 25 and 34 are the cores 27 and 33 of the solenoids 6 and 4, and the armatures 27' and 33' of the electromagnets 19 and 21, respectively. The attachment of the cores to the switches may be either permanent or releasable, as will hereinafter appear. The solenoids 6 and 4 tend to move the switches 25 and 34 farther away from their normal open position to the upper position shown in dotted lines, while the magnets 19 and 21 tend to close said switches or move them to the lower dotted line position illustrated.

The description so far given applies either to the arrangement of Fig. 1 or to the arrangement of Fig. 4, save that the magnets 15 and 17 are absent in the latter.

Referring now particularly to the arrangement shown in Fig. 1, upon the closing of the switch 1 the field and armature circuits of the motor are completed. Because the motor armature current is comparatively large at this time, and also, perhaps, because the time constant of the armature circuit is less than that of the field circuit, the solenoids 6 and 4 lift their cores 27 and 33 and the parts attached thereto against the action of the magnets 19 and 21. The switches 25 and 34 are thus brought into the upper dotted line position, or are moved farther away from their closed position. Each of the solenoid cores in its upward movement also pushes upward a rod 29 and a rack-bar 47, guided by a roller 59; the rack-bar moves the pinion 48 in a counter-clockwise direction, but, on account of the pawl 50 and ratchet 51, does not turn the shaft 49 or the disk 35 carried thereby. For this reason the upward movement of the cores is unretarded.

If the core 27 is releasably attached to the switch 25, the movement of said core and switch to the upper dotted line position causes the projection 42 on the frame of the solenoid 6 to release the latch 41 from the finger 28, thus disengaging the core 27 from the switch 25. The switch now begins to descend by the action of gravity, assisted by the gradually increasing attraction of the magnet 19 for its approaching armature 27'. However, since the switch 25 is still connected through the rod 29 and rack-bar 47 to the pinion 48, this downward movement turns such pinion in a clockwise direction; the movement of the pinion is communicated through the pawl 50 and ratchet 51 to the shaft 49 and the Faraday's disk 35. Since this disk rotates between the poles 52 of the magnet 17, its turning movement develops eddy currents within it, so that the downward movement of the switch 25 is retarded. The rack-bar 47 is made in two parts, the upper part being loosely mounted on the rod 54 extending upward from the lower part. The division between the two parts is such that the lower part passes out of engagement with the pinion 48 when the switch arm 25 approaches its closed or lower dotted line position, so that the last part of the closing movement may be unretarded. The final closing movement, from the full line position to the lower dotted line position, is caused entirely by the magnet 19. The closing of the switch 25 short-circuits the right-hand section of the resistance 10, thereby raising the voltage impressed on the terminals of the armature 2 and increasing the armature current, the latter having decreased somewhat because of the increase in speed and counter-electromotive force of the motor during the time required for the closing of the switch 25. As the motor now continues to increase in speed the armature current again decreases and the solenoid 4 exerts a gradually decreased force on its core 33. This core and the parts attached thereto now begin to drop, under the influence of gravity and of the magnet 21. The downward movement is retarded, however, both by the gradually weakening solenoid 4 and by the Faraday's disk 35 operating between the poles 52 of the magnet 15. This disk 35 retards the switch 34 in precisely the same manner as the disk 35 coöperating with the magnet 17 retards the switch 25. As the switch 34 approaches its closed position, the disk 35 ceases its retarding action because of the disengagement with the lower part of the rack-bar 47 and the pinion 48, and the electromagnet 21 attracts its armature 33' and closes the switch 34 with a quick action to short-circuit the left hand section of the resistance 10. This connects the armature 2 directly across the line.

There may be as many sections of resistance 10 as desired, there being a corresponding number of switches 25 and 34 with their coöperating parts. The solenoids of these switches, such as the solenoids 4 and 6, are wound with the proper number of turns to cause the successive closing of the several switches. The values of current at which the solenoids 4 and 6 let their cores drop may be adjustable, as by brass nuts 57 for limiting the upward movement of such cores. These nuts engage the brass sleeves 58 within the solenoids. This successive closing may be further insured by making the windings 53 of the various retarding magnets, such as 15 and 17, of different numbers of turns, so that the switches which are to be later closed are retarded more strongly than those which are to be earlier closed. The successive closing of the switches may be further insured by means of certain barriers which prevent the closing of any later-closing switch until the next earlier-closing switch has been closed. Thus the armature 33' attached to the switch 34 carries a stop 43 which normally projects over the end of an arm 44 of the bell-crank lever 45. The engagement of the stop 43 and the arm 44 normally prevents the closing of the switch 34. The armature 27' carries a projection 46 which engages the bell-crank lever 45 as the switch 25 is moved to closed position, and thus moves the arm 44 of such lever out of the path of the stop 43. Then, and not until then, can the switch 34 be closed.

When it is desired to stop the motor the switch 1 is opened to break the motor circuits. The springs 26 and 56 then move the switches 25 and 34 from the lower dotted line positions illustrated to the normally open or full line position, and the apparatus is immediately ready for starting the motor a second time by a repetition of the operation above described.

In some cases the retarding disks 35 with their coöperating parts are preferably omitted. It is also sometimes desirable to make the attachment between the core 27 and the switch 25 non-releasable, as is the case between the core 33 and the switch 34. An arrangement omitting both these features is shown in Fig. 4. Upon the closing of the switch 1 in this figure, the solenoids 6 and 4 immediately raise their cores 27 and 33 and move the switches 25 and 34 from the normal or full line position to the upper dotted line position. As the counter-electromotive force of the motor increases, and in consequence the armature current decreases, the solenoids 6 and 4 gradually weaken. The solenoid 6 has the fewer number of turns and allows its core 27 to descend first, under the action of gravity and the magnet 19. The switch 25 passes through its normal or full line position and is brought by the magnet 19 into its closed or lower dotted line position, thus cutting out the first section of the resistance 10. This causes an increase in the electromotive force impressed on the armature terminals and in the current in the armature. As the motor continues to increase in speed and its counter electromotive force continues to rise, the armature current weakens again and the solenoid 4 allows its core 33 to drop under the action of gravity and the magnet 21, and the switch 34 is brought to its closed position by the magnet 21. Thus cuts out the second section of the resistance 10 and connects the motor armature directly across the line. As in the arrangement illustrated in Fig. 1, there may be any desired number of switches 25 or 34, either more or less than the number shown.

Many modifications may be made in the precise arrangements shown and described, and all such which do not involve a departure from the spirit and scope of my invention I aim to cover in the following claims:

What I claim as new is:

1. The combination of an electric switch biased to an open position, means for first moving said switch farther away from its closed position, and means for thereafter moving said switch to its closed position.

2. In combination, an electric motor, a resistance in circuit with said motor, a switch for short-circuiting said resistance, said switch being biased to an open position, an electromagnet energized upon the closing of the motor circuit for moving said switch farther away from its closed position, and means for thereafter moving said switch to its closed position.

3. In a starting device for electric motors, the combination of a resistance, a switch which in one position short-circuits said resistance, said switch being biased to another position, means rendered operative upon the closing of the motor circuit to move said switch to a third position farther removed from its short-circuiting position, and means for thereafter moving said switch to its short-circuiting position.

4. In combination, a motor, a resistance in the armature circuit thereof, a switch for short-circuiting said resistance, said switch being biased to an open position from which it is movable both to closed position and to a position farther removed from closed position, two electromagnets tending to move said switch respectively to closed position and to the position farther away from closed position, the former of said magnets being in a path parallel to that including the motor armature and the other magnet being in series with the motor armature.

5. In combination, an electric motor, a sectional resistance in the armature circuit thereof, switches for short-circuiting the several sections of said resistance, said switches being biased to an open position, means rendered operative upon the closing of the motor circuit for moving said switches farther away from their closed position, and means for thereafter moving said switches successively to closed position.

6. In combination, an electric motor, a sectional resistance in the armature circuit thereof, switches which in one position respectively cut out different parts of said sectional resistance, said switches being biased to a position in which they do not cut out the resistance, electromagnets in series with the motor armature for moving the respective switches farther away from their cutting-out position, and other electromagnets for thereafter moving said switches successively to cutting-out position.

7. In combination, an electric motor, a sectional resistance in the armature circuit thereof, switches for cutting out sections of said resistance, said switches being biased to a position in which they do not cut out such resistance, solenoids in series with the motor armature and tending to move said switches farther away from their cutting-out positions, and means for thereafter moving said switches to cutting-out position.

8. In combination, an electric motor, a sectional resistance in the armature circuit thereof, switches for cutting out sections of said resistance, said switches being biased to a position in which they do not cut out such resistance, solenoids in series with the motor armature and tending to move said switches farther away from their cutting-out positions, and means for thereafter moving said switches successively to cutting-out position.

9. In combination, an electric motor, a resistance in the armature circuit thereof, a switch for cutting out said resistance, said switch being biased to a position in which it does not cut out said resistance, an electromagnet in the armature circuit of the motor for moving said switch from the position to which it is biased to another position farther away from its cutting-out position, and means for moving the switch to its cutting-out position when on account of the increase in the motor speed the current in said electromagnet has decreased sufficiently.

10. In combination, an electric motor, a resistance in circuit therewith, a switch which when closed cuts out such resistance, said switch being normally open, an electromagnet responsive to variations in the current taken by such motor and tending to open such switch wider, and means tending to close such switch.

11. The combination of an electric switch biased to an open position, means for first moving said switch farther way from its closed position, means for thereafter moving said switch to its closed position, and means for retarding the closing movement of said switch.

12. In combination, an electric motor, a resistance in the armature circuit thereof, a switch for cutting out said resistance, said switch being biased to a position in which it does not cut out said resistance, an electromagnet in the armature circuit of the motor for moving said switch from the position in which it is biased to another position farther away from its cutting-out position, means for moving the switch to its cutting-out position when on account of the increase in the motor speed the current in said electromagnet has decreased sufficiently, and means for retarding the movement of the switch away from the position to which it is moved by said electromagnet.

13. In combination, an electric motor, a resistance in circuit therewith, a switch which in its lowest position cuts out such resistance, an electromagnet responsive to the current taken by the motor and tending to hold said switch above its lowest position, and a second electromagnet tending to move said switch to its lowest position.

14. In combination, an electric motor, a sectional resistance in circuit therewith, switches for short-circuiting the several sections of said resistance, electromagnets responsive to variations in the counter-electromotive force of the motor for controlling the closing of said switches, and mechanical interlocking means between the switches to insure their closing in the proper order.

15. In combination, an electric motor, a sectional resistance in circuit therewith, switches for short-circuiting the several sections of said resistance, electromagnets carrying currents proportional to the current taken by said motor and opposing the closing of said switches, other electromagnets tending to close said switches, and mechanical interlocking means between the switches for preventing their closing in any other than the proper order.

In testimony whereof I affix my signature in the presence of two witnesses.

JOHN B. CALDERWOOD.

Witnesses:
JAS. B. ERWIN,
NELLIE Z. TAUGHER.